(12) United States Patent
Jordan et al.

(10) Patent No.: US 12,271,333 B2
(45) Date of Patent: Apr. 8, 2025

(54) PEER-TO-PEER ROUTE THROUGH IN A RECONFIGURABLE COMPUTING SYSTEM

(71) Applicant: SambaNova Systems, Inc., Palo Alto, CA (US)

(72) Inventors: Paul Jordan, Austin, TX (US); Manish K. Shah, Austin, TX (US); Emre Ali Burhan, Sunnyvale, CA (US); Dawei Huang, San Diego, CA (US); Yong Qin, Palo Alto, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 95 days.

(21) Appl. No.: 18/218,562

(22) Filed: Jul. 5, 2023

(65) Prior Publication Data

US 2024/0020261 A1    Jan. 18, 2024

Related U.S. Application Data

(60) Provisional application No. 63/405,240, filed on Sep. 9, 2022, provisional application No. 63/390,484, filed
(Continued)

(51) Int. Cl.
G06F 13/40    (2006.01)
(52) U.S. Cl.
CPC ............... G06F 13/4068 (2013.01)
(58) Field of Classification Search
CPC ............ G06F 13/4068; H04L 12/5689
(Continued)

(56) References Cited

U.S. PATENT DOCUMENTS 8,321,618 B1    11/2012    Keil et al.
10,698,853 B1    6/2020    Grohoski et al.
(Continued)

FOREIGN PATENT DOCUMENTS

EP       1877927 B1       3/2011
WO    2010142987 A1    12/2010

OTHER PUBLICATIONS

Ming et al., A Reconfigurable Soc for Block Ciphers with a Programmable Dataflow Structure, dated Apr. 18-20, 2011, Third International Conference on Communications and Mobile Computing, 4 pages.
(Continued)

*Primary Examiner* — Ilwoo Park
(74) *Attorney, Agent, or Firm* — Flagship Patents; Bruce A. Young; Sikander M. Khan

(57) ABSTRACT

A reconfigurable dataflow unit (RDU) includes an intra-RDU network, an array of configurable units connected by an array level network and function interfaces. The RDU also includes interface circuits coupled between the intra-RDU network and external interconnects. An interface circuit receives a packet from the external interconnect and extracts a target RDU identifier and compares the target RDU identifier to the value of the identity register. It also communicates over the intra-RDU network to a function interface based on information in the first packet in response to the target RDU identifier being equal to the identity register. The interface circuit retrieves another interface circuit identifier for the target RDU identifier from the pass-through table and, in response to the target RDU identifier not being equal to the identity register, sends the target RDU identifier and other information to the other interface circuit over the intra-RDU network.

20 Claims, 8 Drawing Sheets

Related U.S. Application Data on Jul. 19, 2022, provisional application No. 63/389,767, filed on Jul. 15, 2022.

(58) Field of Classification Search
USPC ..... 326/37–41; 370/352–356, 389, 392, 397, 370/399, 406, 409; 710/38, 105, 316
See application file for complete search history.

(56) References Cited

U.S. PATENT DOCUMENTS

| | | | |
|---|---|---|---|
| 10,886,921 B1 * | 1/2021 | Koganti | .................. H01L 24/08 |
| 10,908,914 B2 | 2/2021 | Vorbach et al. | |
| 11,615,038 B2 * | 3/2023 | Tørudbakken | ........ G06F 9/5044 370/389 |
| 2005/0257012 A1 | 11/2005 | Hughes | |
| 2009/0300262 A1 | 12/2009 | Vorbach | |
| 2010/0191911 A1 | 7/2010 | Heddes et al. | |
| 2010/0293304 A1 | 11/2010 | Alexandron et al. | |
| 2015/0227490 A1 | 8/2015 | Seo et al. | |
| 2016/0055120 A1 | 2/2016 | Vorbach et al. | |
| 2016/0188469 A1 | 6/2016 | Nagarajan et al. | |
| 2018/0089132 A1 | 3/2018 | Atta et al. | |
| 2022/0171716 A1 | 6/2022 | Benisty et al. | |
| 2023/0070690 A1 | 3/2023 | Mugu et al. | |
| 2023/0244748 A1 | 8/2023 | Natarja et al. | |
| 2023/0251839 A1 | 8/2023 | Shah et al. | |
| 2023/0251993 A1 | 8/2023 | Shah et al. | |
| 2024/0020261 A1 | 1/2024 | Jordan et al. | |

OTHER PUBLICATIONS

Prabhakar et al., SambaNova SN10 RDU: A 7nm Dataflow Architecture to Accelerate Software 2.0, dated Feb. 20-26, 2022, IEEE International Solid-State Circuits Conference, 3 pages.
U.S. Appl. No. 18/383,718—Notice of Allowance, dated Jul. 15, 2024, 12 pages.
U.S. Appl. No. 18/107,613—Non-Final Rejection dated May 13, 2024, 8 pages.
U.S. Appl. No. 18/199,361—Non-Final Rejection dated Dec. 21, 2023, 12 pages.
U.S. Appl. No. 18/199,361—Non-Final Rejection dated Jul. 3, 2024, 17 pages.
U.S. Appl. No. 63/349,733, filed Jun. 7, 2022, Manish K. Shah.
CA 3125707—First Office Action, dated Jan. 21, 2022, 3 pages.
CA 3125707—Voluntary Amendments, dated Jan. 4, 2022, 8 pages.
EP 20702339.8—Response to Rules 161(1) and 162 Communication, filed Feb. 25, 2022, 10 pages.
EP 20702939.8—Rules 161(1) and 162 Communication, dated Aug. 18, 2021, 3 pages.
Koeplinger et al., Spatial: A Language and Compiler for Application Accelerators, PLDI '18, Jun. 18-22, 2018, Association for Computng Machinery, 16 pages.
M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/MCSE.2021.3057203].
PCT/US2020/012079—International Preliminary Report on Patentability, dated May 7, 2021, 14 pages.
PCT/US2020/012079—International Search Report and Written Opinion mailed Apr. 29, 2020, 18 pages.
PCT/US2020/012079—Second Article 34 Amendment {Response to Informal Communication by Telephone) dated Feb. 2, 2021, as filed on Apr. 2, 2021, 5 pages.
PCT/US2023/012723—International Search Report and Written Opinion, dated May 31, 2023, 13 pages.
Podobas et al, A Survey on Coarse-Grained Reconfigurable Architectures From a Performance Perspective, IEEEAccess, vol. 2020. 3012084, Jul. 27, 2020, 25 pages.
Prabhakar et al., Plasticine: A Reconfigurable Architecture for Parallel Patterns, ISCA, Jun. 24-28, 2017, 14 pages.
TW 108148376—Notice of Allowance dated Oct. 23, 2020, 5 pages.
TW 108148376—Request for Exam and Voluntary Amendment filed Jun. 30, 2020, 17 pages.
TW 110101760—First Office Action dated Mar. 29, 2022, 12 pages.
TW110101760—Notice of Allowance, dated Sep. 21, 2022, 2 pages.
U.S. Appl. No. 16/239,252—Notice of Allowance dated Feb. 12, 2020, 10 pages.
U.S. Appl. No. 16/239,252—Notice of Allowance dated May 14, 2020, 15 pages.
U.S. Appl. No. 16/239,252—Office Action dated Aug. 7, 2019, 8 pages.
U.S. Appl. No. 16/239,252—Response to Final Office Action dated Jan. 8, 2020 filed Jan. 24, 2020, 14 pages.
U.S. Appl. No. 16/239,252—Response to Office Action dated Aug. 7, 2019, filed Sep. 26, 2019, 6 pages.
U.S. Appl. No. 16/239,252 Final Office Action, dated Jan. 8, 2020, 13 pages.
U.S. Appl. No. 16/862,445—Notice of Allowance, dated Sep. 17, 2021, 15 pages.
U.S. Appl. No. 16/862,445—Response to Office Action dated Mar. 18, 2021, filed Jun. 9, 2021, 12 pages.
U.S. Appl. No. 18/107,690—Notice of Allowance, dated Mar. 6, 2024, 9 pages.

\* cited by examiner

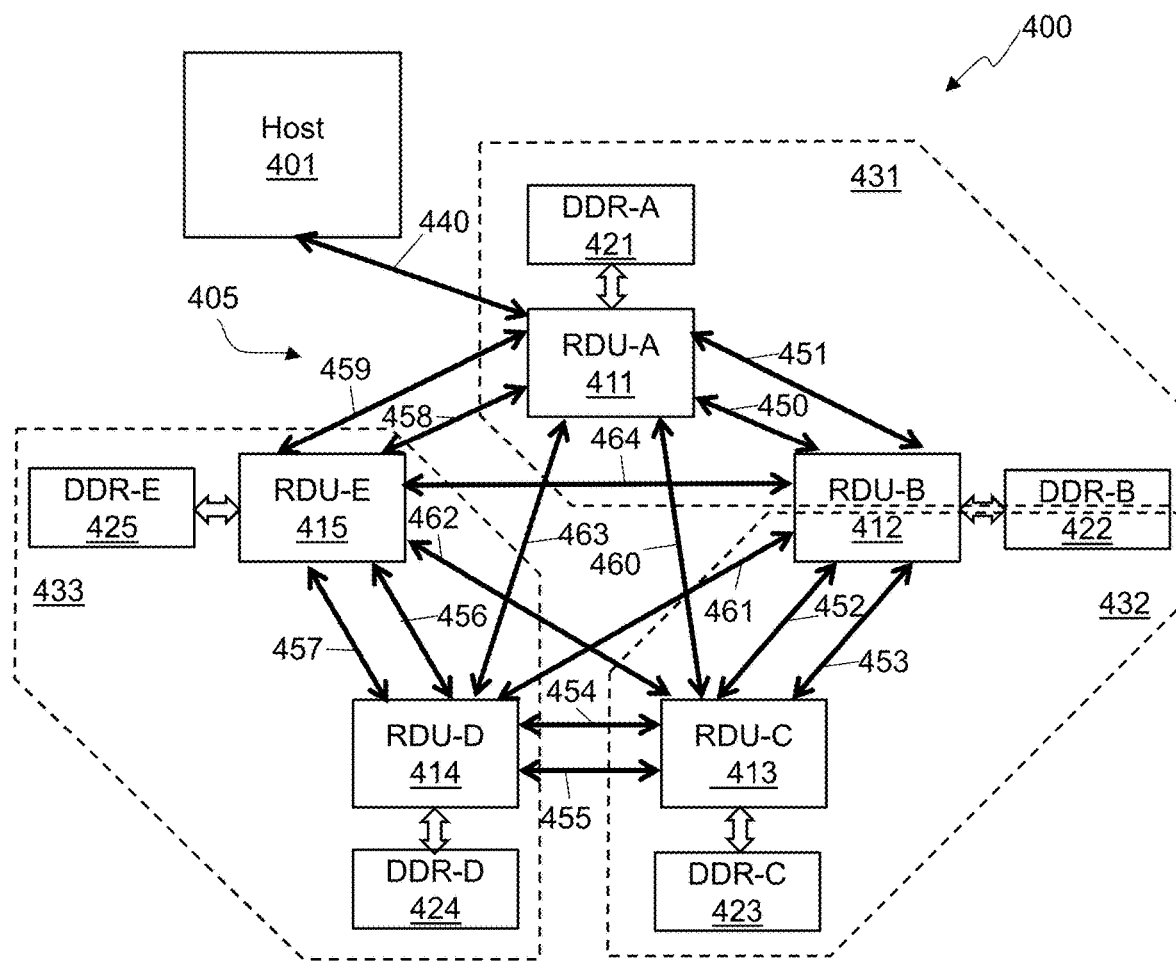

FIG. 4A

Pass-Through Tables

| DEST | Table A | Table B | Table C | Table D | Table E |
|---|---|---|---|---|---|
| RDU-A | -- | CCW2 port link 450 | StarA port link 460 | StarA port link 463 | CW1 port link 459 |
| RDU-B | CW1 port link 451 | -- | CCW2 port link 452 | StarB port link 461 | StarB port link 464 |
| RDU-C | StarC port link 460 | CW1 port link 453 | -- | CCW2 port link 454 | StarC port link 462 |
| RDU-D | StarD port link 463 | StarD port link 461 | CW1 port link 455 | -- | CCW2 port link 456 |
| RDU-E | CCW2 port link 458 | StarE port link 464 | StarE port link 462 | CW1 port link 457 | -- |

FIG. 4B

Pass-Through Tables

| DEST | Table W | Table X | Table Y | Table Z |
|---|---|---|---|---|
| RDU-W | -- | West port link 481 | North port link 482 | North port link 483 |
| RDU-X | East port link 481 | -- | North port link 482 | North port link 483 |
| RDU-Y | South port link 482 | South port link 483 | -- | West port link 484 |
| RDU-Z | South port link 482 | South port link 483 | East port link 484 | -- |

PEER-TO-PEER ROUTE THROUGH IN A RECONFIGURABLE COMPUTING SYSTEM

CROSS-REFERENCE

This application claims the benefit of U. S. Provisional Patent Application No. 63/390,484, entitled "Peer-To-Peer Route Through In A Reconfigurable Computing System," filed on Jul. 19, 2022, U.S. Provisional Patent Application No. 63/405,240, entitled "Peer-To-Peer Route Through In A Reconfigurable Computing System," filed on Sep. 9, 2022, and U.S. Provisional Application 63/389,767, entitled "Peer-to-Peer Communication between Reconfigurable Dataflow Units," filed on Jul. 15, 2022. It is also related to U.S. patent application Ser. No. 18/107,690, entitled "Two-Level Arbitration in a Reconfigurable Processor" filed on Feb. 9, 2023. All four of the aforementioned applications are incorporated by reference herein for any and all purposes.

This application is related to Prabhakar et al., "Plasticine: A Reconfigurable Architecture for Parallel Patterns," ISCA '17, Jun. 24-28, 2017, Toronto, ON, Canada and Koeplinger et al., "Spatial: A Language And Compiler For Application Accelerators," Proceedings Of The 39th ACM SIGPLAN Conference On Programming Language Design And Embodiment (PLDI), Proceedings of the 43rd International Symposium on Computer Architecture, 2018, which are both incorporated by reference herein for any and all purposes.

BACKGROUND

The present subject matter relates to communication between integrated circuits, more specifically to inter-die communication between elements that respectively communicate on their own intra-die network.

Reconfigurable processors, including field programmable gate arrays (FPGAs), can be configured to implement a variety of functions more efficiently or faster than might be achieved using a general purpose processor executing a computer program. So called Coarse-Grained Reconfigurable Architectures (e.g., CGRAs) are being developed in which the configurable units in the array are more complex than used in typical, more fine-grained FPGAs, and may enable faster or more efficient execution of various classes of functions. For example, CGRAs have been proposed that can enable implementation of energy-efficient accelerators for machine learning and artificial intelligence workloads.

BRIEF DESCRIPTION OF THE DRAWINGS

The accompanying drawings, which are incorporated in and constitute part of the specification, illustrate various implementations. Together with the general description, the drawings serve to explain various principles. In the drawings:

FIG. 4A is a block diagram depicting one example of a reconfigurable computing environment wherein various implementations disclosed herein may be deployed;

FIG. 4B depicts example RDU configuration tables in accordance with various implementations disclosed;

DETAILED DESCRIPTION

Figure 1:
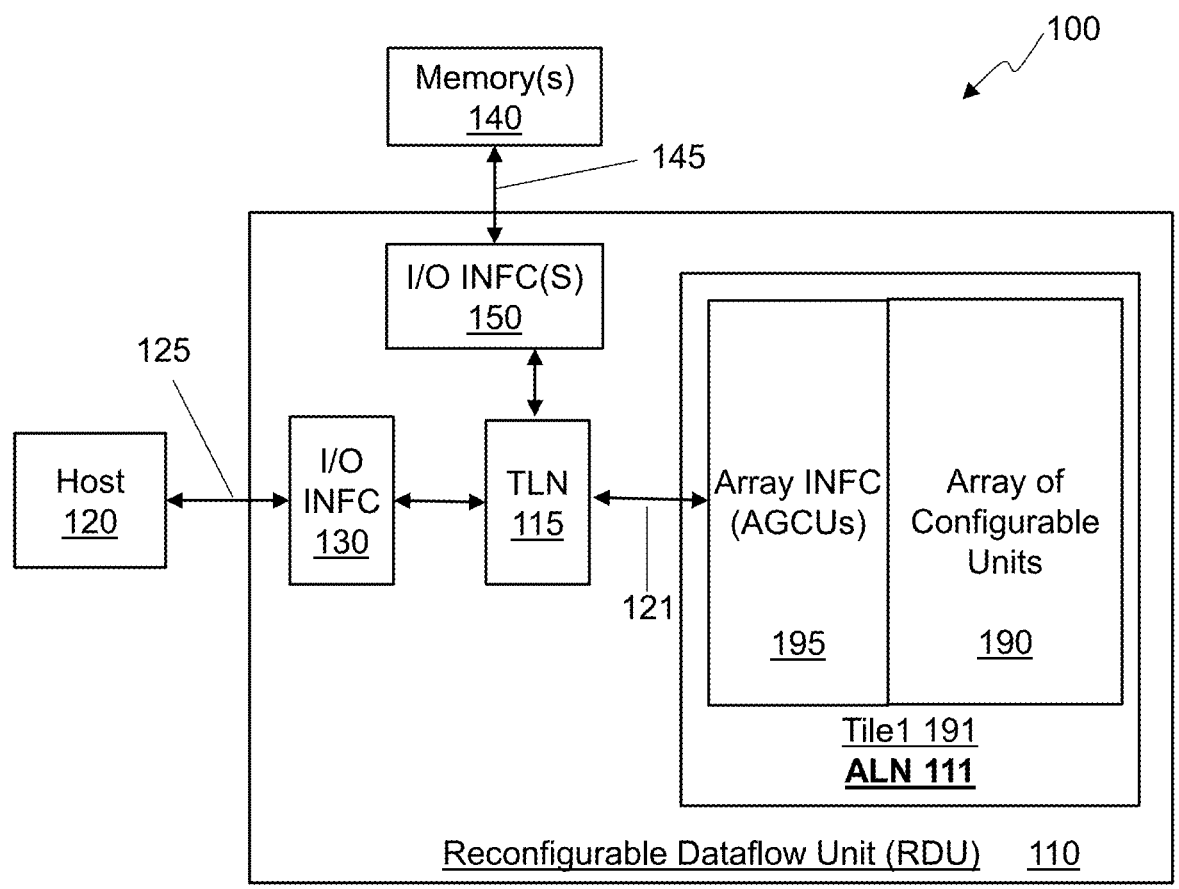
FIG. 1 is a block diagram illustrating an example system including a host, a memory, and a reconfigurable data processor, as an example of the present disclosure.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high level, without detail, in order to avoid unnecessarily obscuring aspects of the present concepts. A number of descriptive terms and phrases are used in describing the various implementations of this disclosure. These descriptive terms and phrases are used to convey a generally agreed upon meaning to those skilled in the art unless a different definition is given in this specification.

In a system having multiple Reconfigurable Dataflow Units (RDUs), the nodes of a computational graph can be split across multiple RDU sockets. The communication between RDU peers (i.e., peer-to-peer, or P2P, communication) is achieved using transactions which are implemented as a layer on the top of the transaction layer packet (TLP) of a Peripheral Component Interconnect Express (PCIe) interconnect by encapsulating P2P protocol messages in the TLP payload. Units on the internal intra-die networks in the RDU include specific functionality to support for P2P transactions.

Various P2P transactions may be supported by the technology described herein. These transactions include primitive protocol messages, and complex transactions consisting of one or more primitive protocol messages. The following list may be interpreted as providing examples for various implementations and some implementations may support a subset of the messages and transactions listed and some implementations may support messages and transactions not listed below using similar mechanisms to those disclosed herein.

Primitive P2P Protocol Messages:
    Remote Read Request
    Remote Write Request
    Remote Read Completion
    Stream Write
    Stream CTS
    RSync Barrier
    Complex P2P Transactions composed from one or more protocol messages:
    Remote Write—Scatter or Store
    Remote Read—Load or Gather
    Stream Write to a Remote PMU
    Stream Write to Remote DRAM Host Write
Host Read
Barrier Related U.S. Provisional Application 63/389,767 entitled Peer-to-Peer Communication between Reconfigurable Dataflow Units," and filed on Jul. 15, 2022, describes these P2P protocol messages in more detail.

While some systems may utilize a switching fabric between the RDUs to route the P2P messages between RDUs, this requires extra hardware to implement the switching fabric. In some cases, it may be desirable to implement a set of point-to-point links between RDUs which can handle most of the P2P messaging but enable a route-through capability to handle P2P messages where the direct connections between the RDUs either are overloaded or are nonexistent. The route-through capability allows the P2P message to be sent to an RDU that is not the target of the P2P message and have RDUs effectively act as the switching fabric to route the P2P message to the proper RDU without needing to add external components. Such a P2P route-through functionality is disclosed herein.

Reference now is made in detail to the examples illustrated in the accompanying drawings and discussed below.

FIG. 1 is a system diagram illustrating an example system 100 including a host 120, a memory 140, and a reconfigurable dataflow unit (RDU) 110. As shown in the example of FIG. 1, the RDU 110 includes an array 190 of configurable units and an interface 195 to a top-level network 115 which may be called an address generation and coalescing unit (AGCU) herein. The interface 195 can include a configuration load controller and a configuration unload controller. The configuration load controller and the configuration unload controller may be implemented using separate logic and data path resources or may be implemented using shared logic and data path resources as suits a particular implementation.

The array 190 and the AGCUs 195 can be referred to as a tile1 191 and includes an array level network (ALN) 111. The ALN 111 is coupled to a top-level network (TLN) 115 as shown by the interconnect 121. The RDU 110 includes an external I/O interface 130 connected to the host 120 by link 125, and external I/O interface 150 connected to the memory 140 by link 145. The I/O interfaces 130, 150 connect via the top-level network (TLN) 115 through the interface 195 to the array 190 of configurable units. The TLN 115 may include a mesh network of switches coupled to the I/O interfaces 130, 150, and the AGCUs 195. The TLN 115 may also be called an intra-RDU network or a switching array fabric and those terms are used interchangeably herein.

In a more general sense, in one implementation, the entire top-level network may include the AGCUs 195, the I/O interfaces 130 and 150, and the TLN 115 (switches). The AGCUs 195 and the I/O interfaces 130 and 150 may be known as TLN agents. Furthermore, the AGCUs 195 are also part of the ALN 111 and may be known as ALN agents.

Figure 2:
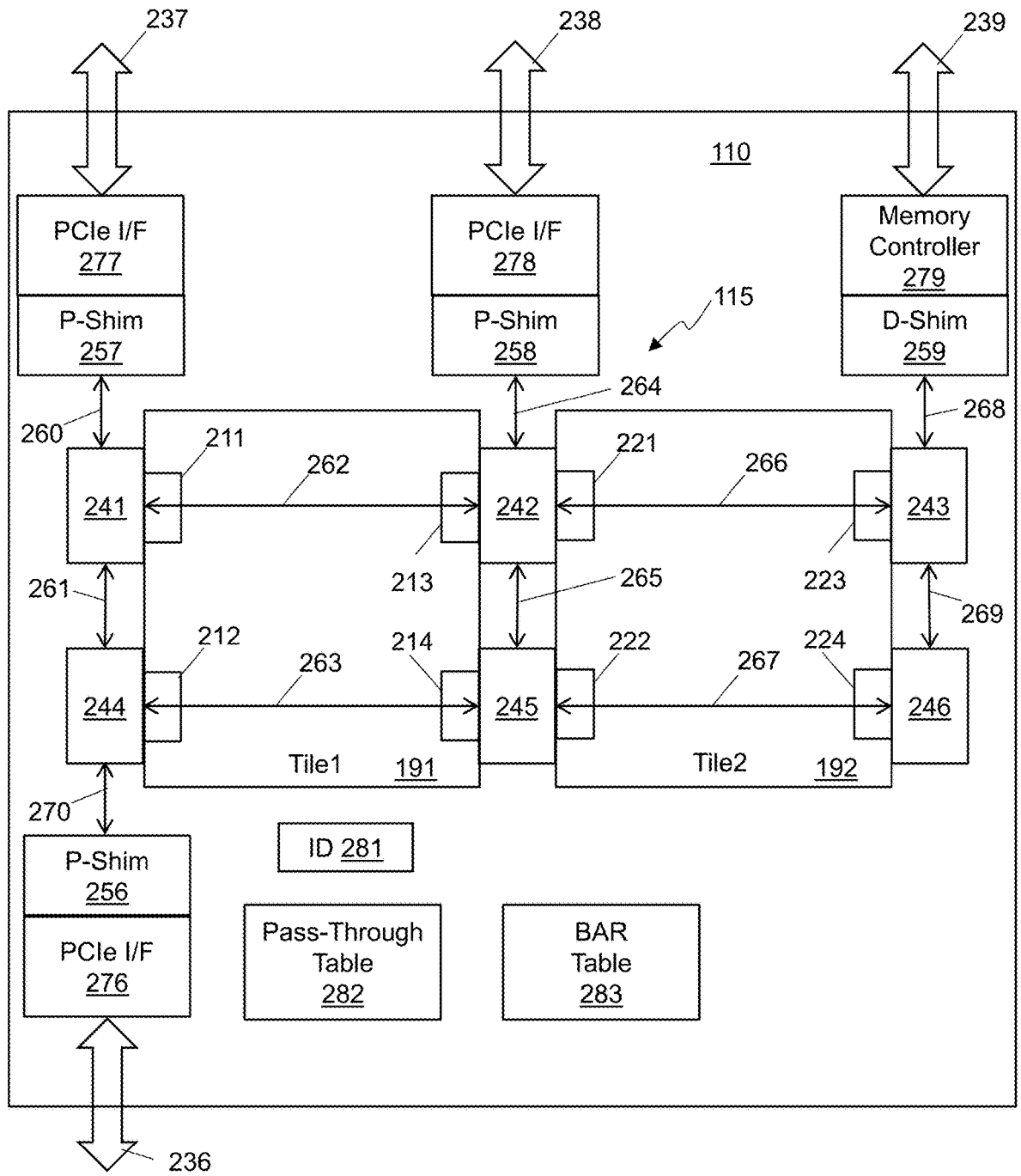
FIG. 2 is a block diagram of an example Reconfigurable Dataflow Unit (RDU) having a CGRA (Coarse-Grained Reconfigurable Architecture)

FIG. 2 is a block diagram of the example RDU 110 having a CGRA (Coarse Grain Reconfigurable Architecture) showing a different level of detail than the block diagram of FIG. 1. In this example, 2 tiles (Tile1 191, Tile2 192) in the RDU 110 are shown, although other implementations can have any number of tiles, including a single tile. A tile 191, 192 (which is shown in more detail in FIG. 3A) comprises an array of configurable units connected by an array-level network in this example. Each of the two tiles 191, 192 has one or more AGCUs (Address Generation and Coalescing Units) 211-214, 221-224. The AGCUs are nodes on both a top-level network 115 and on array-level networks within their respective tiles 191, 192 and include resources for routing data among nodes on the top-level network 115 and nodes on the array-level network in each tile 191, 192.

The tiles 191, 192 are coupled a top-level network (TLN) 115 (also known as an intra-RDU network or switching array fabric) that includes switches 241-246 and links 260-270 that allow for communication between elements of Tile1 191, elements of Tile2 192, and shims to other functions of the RDU 110 including P-Shims 256-258 and D-Shim 259. Other functions of the RDU 110 may connect to the TLN 115 in different implementations, such as additional shims to additional and or different input/output (I/O) interfaces and memory controllers, and other chip logic such as CSRs, configuration controllers, or other functions. Data travel in packets between the devices (including switches 241-246) on the links 260-270 of the TLN 115. For example, top-level switches 241 and 242 are connected by a link 262, top-level switch 241 and P-Shim 257 are connected by a link 260, top-level switches 241 and 244 are connected by a link 261, and top-level switch 243 and D-Shim 259 are connected by a link 268.

The TLN 115 is a packet-switched mesh network with four independent networks operating in parallel; a request network, a data network, a response network, and a credit network. While FIG. 2 shows a specific set of switches and links, various implementations may have different numbers and arrangements of switches and links. All 4 networks (request, data, response, and credit) follow the same protocol. The only difference between the four networks is the size and format of their payload packets. A TLN transaction consists of 4 parts, a valid signal, a header, a packet, and a credit signal. To initiate a transaction, a TLN agent (the driver) can assert the valid signal and drive the header on the link connected to a receiver. The header consists of the node ID of the source and destination. Note that source and destination refer to the endpoints of the overall transaction, not the ID of an intermediate agent such as a switch. In the following cycle, the agent will drive the packet. The credit signal is driven by the receiver back to the driver when it has dequeued the transaction from its internal queues. TLN agents have input queues to buffer incoming transactions. Hop credits are assigned to drivers based on the sizes of those queues. A driver cannot initiate a transaction (i.e., assert the valid signal) unless it has credits available.

There are two types of credits used to manage traffic on the TLN 115. The first, as mentioned above, are hop credits. These are credits used to manage the flow of transactions between adjacent points on the network. The other type of credit is referred to as an end-to-end credit. In order to prevent persistent backpressure on the TLN 115, communication on the TLN 115 is controlled by end-to-end credits. The end-to-end credits create a contract between a transaction source and an endpoint to which it sends the transaction. An exception to this is a destination that processes inbound traffic immediately with no dependencies. In that case the number of end-to-end credits can be considered infinite, and no explicit credits are required. The number of end-to-end credits is generally determined by the size of input queues in the destination units. Agents will generally have to perform both a hop credit check to the connected switch and an end-to-end credit check to the final destination. The transaction can only take place if a credit is available to both. Note that the TLN components (e.g., switches) do not directly participate in or have any knowledge of end-to-end credits. These are agreements between the connected agents and not a function of the network itself.

As was previously mentioned, the TLN 115 is a packet-switched mesh network using an array of switches for communication between agents. Any routing strategy can be used on the TLN 115, depending on the implementation, but some implementations may arrange the various components of the TLN 115 in a grid and use a row, column addressing scheme for the various components. Such implementations may then route a packet first vertically to the designated row, and then horizontally to the designated destination. Other implementations may use other network topologies and/or routing strategies for the TLN 115.

P-Shims 256-258 provide an interface between the TLN 115 and PCIe Interfaces 276-278 which connect to external communication links 236-238. While three P-Shims 256, 257, 258 with PCIe interfaces 276, 277, 278 and associated PCIe links 236, 237, 238 are shown, implementations can have any number of P-Shims and associated PCIe interfaces and links. A D-Shim 259 provides an interface to a memory controller 279 which has a DDR interface 239 and can connect to memory such as the memory 140 of FIG. 1. While only one D-Shim 259 is shown, implementations can have any number of D-Shims and associated memory controllers and memory interfaces. Different implementations may include memory controllers for other types of memory, such as a flash memory controller and/or a high-bandwidth memory (HBM) controller. The interfaces 256-259 include resources for routing data among nodes on the top-level network (TLN) 115 and external devices, such as high-capacity memory, host processors, other CGRA processors, FPGA devices and so on, that are connected to the interfaces 236-239.

As explained earlier, in the system shown in FIG. 1 each RDU can include an array of configurable units that is disposed in a configurable interconnect (array level network), and the configuration file defines a data flow graph including functions in the configurable units and links between the functions in the configurable interconnect. In this manner the configurable units act as sources or sinks of data used by other configurable units providing functional nodes of the graph. Such systems can use external data processing resources not implemented using the configurable array and interconnect, including memory and a processor executing a runtime program, as sources or sinks of data used in the graph.

Furthermore, such systems may include communication resources which can be arranged in a mesh-like network known as a top-level network (TLN) 115. The communication resources may facilitate communication between the configurable interconnect of the array (array level network) and the external data processing resources (memory and host). In one implementation, the tiles tile0 and tile1 in the RDU 110 are connected to the host 120 via the top-level network (TLN) 115 including links 260-270 shown in FIG. 2.

More details about the TLN and the on-chip arrangement of the RDU 110, the ALN, and the TLN and communication among those are described in related U.S. patent application Ser. No. 18/107,690, entitled "Two-Level Arbitration in a Reconfigurable Processor."

The RDU 110 may include multiple communication ports 236-238 which may be usable for communicating with external computing resources, one or more memory ports 239 to interface with external memory (e.g. DDR memory although any type of memory may be supported depending on the implementation), multiple memory units and compute units in the tiles 191, 192 (described in more detail in FIG. 3A below) and a switching array fabric which may include the TLN 115 and/or the ALN. The RDU 110 may also include one or more stall detection modules in some implementations.

The communication ports 236-238 may be configured to receive data packets from, and provide data packets to, various internal elements of the RDU 110 such as the memory units and/or the compute units in the tiles 191 192 and/or the memory controller 279 for accessing data in the external memory. The communication ports 236-238 may also receive data packets from, and provide data packets to, various external elements such as other RDUs and a host. The communication ports 236-238 may support a high-speed communication protocol such as PCIe, InfiniBand, Fibre Channel, Gigabit Ethernet, or other types of communication protocols including high speed serial protocols and parallel communication protocols.

The switching array fabric (e.g., the TLN 115) may carry and route traffic between the various internal elements including the depicted elements. Resource arbitration modules may provide arbitration on the switching array fabric for resources such as P2P ports that is fair (i.e., other requesters cannot persistently nor indefinitely block a requestor). By providing fair arbitration every requestor is eventually serviced regardless of other requests.

Implementations of the RDU 110 also include an identity (ID) register 281 to store an identifier of the particular RDU 110 which may be unique among RDUs in a system. Implementations of the RDU 110 also include a pass-through table 282 to store an identifier of a particular P-Shim (e.g., one of a first P-Shim 256, a second P-Shim 257, or a third P-Shim 258) for each of a plurality of other RDU identifiers. Depending on the implementation, the ID register 281 and the pass-through table 282 may be accessible from each of the P-Shims 256-258 or may be duplicated in each P-Shim 256-258. Implementations also include a Base Address Register (BAR) Table 283 to store a base address to be used to communicate with various other RDUs coupled to the RDU 110 through the interconnects 236-238. The BAR table 283 may be accessible from each of the P-Shims 256-258 or may be duplicated in each P-Shim 256-258. In some implementations, the BAR table 283 may be distributed among the P-Shims 256-258. The ID register 281, the pass-through table 282, and the BAR table 283 may all be configurable using a configuration file for the RDU 110 and their use will be described later.

The RDU 110 may also include stall detection modules which may detect various types of stall conditions such as a lack of execution progress, a lack of communication activity or the presence of activities that can stall execution or communications. In response thereto, the RDU 110 may execute one or more responses such as abandoning execution of a graph, halting or restarting one or more compute or memory units within the grid of configurable units, filtering communication addressed to the configurable units, informing other RDUs and/or informing a host.

Thus, a reconfigurable dataflow unit (RDU) 110 may include an intra-RDU network, such as the TLN 115, and a plurality of interface circuits including a first interface circuit, such as P-Shim 256, a second interface circuit, such as P-Shim 257, and a third interface circuit, such as P-Shim 258, coupled between the intra-RDU network and a respective external interconnect. In this example, the first interface circuit (P-Shim) 256 is coupled between the intra-RDU network (TLN) 115 and the first interconnect 236 external to the RDU 110. The second interface circuit (P-Shim) 257 is coupled between the intra-RDU network (TLN) 115 and the second interconnect 237 external to the RDU 110 110. And the third interface circuit (P-Shim) 258 is coupled between the intra-RDU network (TLN) 115 and the third interconnect 238 external to the RDU 110. In some implementations, an interface unit to handle the protocol of the external interconnect may be interposed between the interface circuit and the external interconnect, such as the PCIe Interfaces 276-278 shown in FIG. 2, but other implementations may include the protocol engine in the interface circuit.

The RDU 110 also includes an array of configurable units (tile1 191 and/or tile2 192) having a coarse grain reconfigurable architecture and including a plurality of configurable processing units and a plurality of configurable memory units connected by an array level network. In addition, the RDU 110 includes one or more function interfaces that respectively provide a connection between the intra-RDU network 115 and the array level network or another functional unit of the first RDU. In FIG. 2 this includes the D-Shim 259 which is coupled between the TLN 115 and the memory controller 279 and the AGCUs 211-224 which are coupled between the TLN 115 and the arrays of configurable units 191, 192. The RDU also has an identity register 281 to store an identifier for the RDU 110 and a pass-through table 282 to store an interface circuit identifier (e.g., an identifier for one of the P-Shims 256-258) for each of a plurality of other RDU identifiers.

The RDU 110 may be implemented using any appropriate technology and using any level of integration so that the RDU 10 may constitute various circuits spread across multiple printed circuit boards (PCBs) or on a single PCB. In many implementations, the RDU 110 may be implemented on a single integrated circuit die, or as two or more integrated circuit dies mounted in a multi-die package.

Figure 3A:
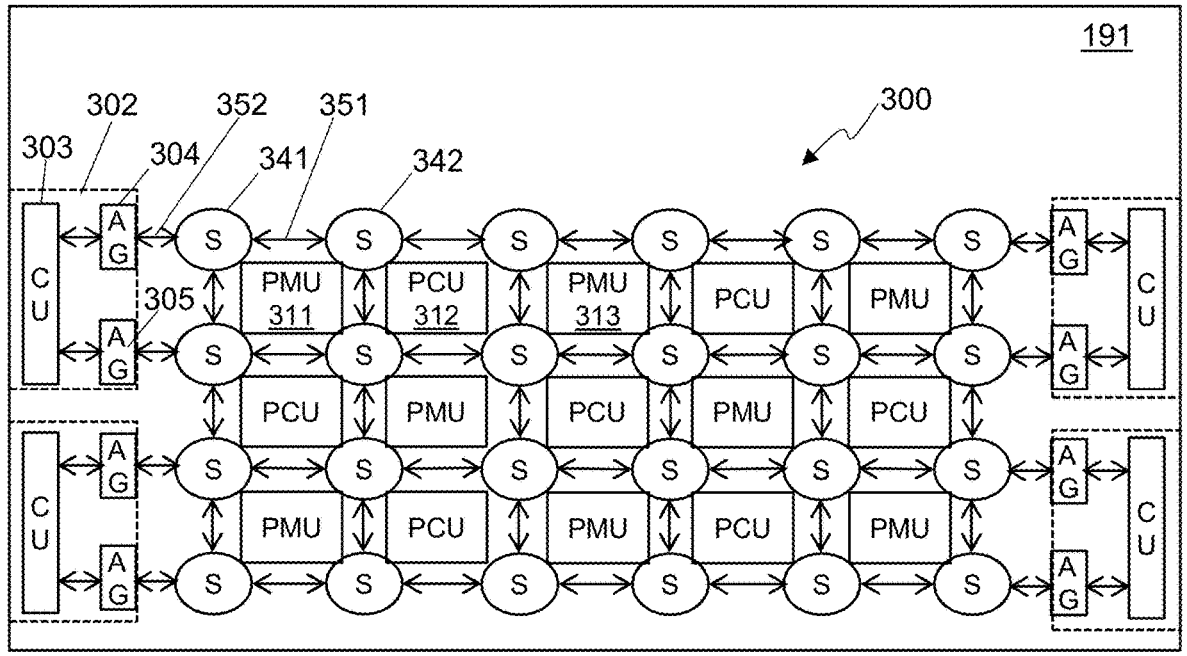
FIG. 3A is a simplified diagram of an example tile of an RDU.

FIG. 3A is a simplified diagram of tile 191 (which may be identical to tile 192) of FIG. 2, where the configurable units in the array 300 are nodes on the array-level network. In this example, the array of configurable units 300 includes a plurality of types of configurable units. The types of configurable units in this example include Pattern Compute Units (PCU) such as PCU 312, Pattern Memory Units (PMU) such as PMUs 311, 313, switch units (S) such as Switches 341, 342, and Address Generation and Coalescing Units (AGCU) such as AGCU 302. An AGCU can include one or more address generators (AG) such as AG 304, 305 and a shared coalescing unit (CU) such as CU 303. For an example of the functions of these types of configurable units, see Prabhakar et al., "Plasticine: A Reconfigurable Architecture for Parallel Patterns."

Each of these configurable units contains a configuration store comprising a set of registers or flip-flops that represent either the setup or the sequence to run a program, and can include the number of nested loops, the limits of each loop iterator, the instructions to be executed for each stage, the source of the operands, and the network parameters for the input and output interfaces. Additionally, each of these configurable units contains a configuration store comprising a set of registers or flip-flops that store status usable to track progress in nested loops or otherwise. A configuration file contains a bit-stream representing the initial configuration, or starting state, of each of the components that execute the program. This bit-stream is referred to as a bit-file. Program load is the process of setting up the configuration stores in the array of configurable units by a configuration load/unload controller in an AGCU based on the contents of the bit file to allow all the components to execute a program (i.e., a graph). Program Load may also load data into a PMU memory.

The array-level network includes links interconnecting configurable units in the array. The links in the array-level network include one or more and, in this case three, kinds of physical buses: a chunk-level vector bus (e.g., 128 bits of data), a word-level scalar bus (e.g. 32 bits of data), and a multiple bit-level control bus. For instance, interconnect 351 between switch 341 and 342 includes a vector bus interconnect with vector bus width of 128 bits, a scalar bus interconnect with a scalar bus width of 32 bits, and a control bus interconnect.

The three kinds of physical buses differ in the granularity of data being transferred. In one implementation, the vector bus can carry a chunk that includes 16-Bytes (=128 bits) of data as its payload. The scalar bus can have a 32-bit payload and carry scalar operands or control information. The control bus can carry control handshakes such as tokens and other signals. The vector and scalar buses can be packet switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g. North, South, East, West, etc.) used to reach the destination unit. The control network can be circuit switched based on timing circuits in the device, for example. The header is transmitted on a header bus to each configurable unit in the array of configurable unit.

In one example, a chunk of data of 128 bits is transmitted on the vector bus that provides the chunk as vector inputs to a configurable unit. The vector bus can include 128 payload lines, and a set of header lines. The header can include a sequence ID for each chunk, which can include (as non-limiting examples):

A bit to indicate if the chunk is scratchpad memory or configuration store data.
Bits that form a chunk number.
Bits that indicate a column identifier.
Bits that indicate a row identifier.
Bits that indicate a component identifier.

The array-level network may route the data of the vector bus and/or scalar bus using two-dimension order routing using either a horizontal first or vertical first routing strategy. The vector bus and/or scalar bus may allow for other types of routing strategies, including using routing tables in switches to provide a more flexible routing strategy in some implementations.

Figure 3B:
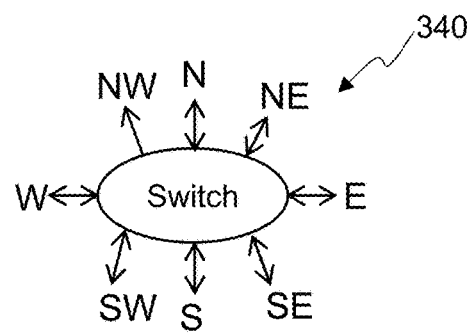
FIG. 3B illustrates an example switch unit for connecting elements in an array-level network.

FIG. 3B illustrates an example switch unit 340 connecting elements in an array-level network such as switches 341, 342 of the array 300 in FIG. 3A. As shown in the example of FIG. 3B, a switch unit can have 8 interfaces. The North, South, East, and West interfaces of a switch unit are used for connections between switch units. The Northeast, Southeast, Northwest, and Southwest interfaces of a switch unit are each used to make connections to PCU or PMU instances. At least some switch units at the edges of the tile have connections to an Address Generation and Coalescing Unit (AGCU) that include multiple address generation (AG) units and a coalescing unit (CU) connected to the multiple address generation units. The coalescing unit (CU) arbitrates between the AGs and processes memory requests. Each of the 8 interfaces of a switch unit can include a vector interface, a scalar interface, and a control interface to communicate with the vector network, the scalar network, and the control network.

During execution of a machine after configuration, data can be sent via one or more unit switches and one or more links between the unit switches to the configurable units using the vector bus and vector interface(s) of the one or more switch units on the array-level network.

The configurable units can access off-chip memory through D-Shim 259 and memory controller 279 (see FIG. 2) by routing a request through an AGCU. An AGCU contains a reconfigurable scalar data path to generate requests for the off-chip memory. The AGCU contains FIFOs (first-in-first-out buffers for organizing data) to buffer outgoing commands, data, and incoming responses from the off-chip memory.

The address generators (AGs) in the AGCUs can generate memory commands that are either dense or sparse. Dense requests can be used to bulk transfer contiguous off-chip memory regions and can be used to read or write chunks of data from/to configurable units in the array of configurable units. Dense requests can be converted to multiple off-chip memory burst requests by the coalescing unit (CU) in the AGCUs. Sparse requests can enqueue a stream of addresses into the coalescing unit. The coalescing unit uses a coalescing cache to maintain metadata on issued off-chip memory requests and combines sparse addresses that belong to the same off-chip memory request to minimize the number of issued off-chip memory requests.

An AGCU has a set of virtual address generators (VAGs) that can be programmed to communicate with a particular configurable unit in the array 300, such as a PMU 311. Each VAG can also be programmed to generate a particular address pattern and includes several other features which are described later in this disclosure. In at least one implementation, each AGCU includes 16 VAGs. In some implementations, the address generation units (e.g., AG 304) may each be a VAG.

There are cases where a configurable unit on one RDU may want to send or receive data controlled by another RDU. The peer-to-peer (P2P) protocol provides several primitives that can be used to accomplish this, including a remote write, a remote read request, a remote read completion, a stream write, a stream clear-to-send (SCTS), and/or a barrier operation. The P2P primitives can be used to create more complex transactions that utilize one or more P2P primitive operations. The complex transactions may include a remote store, a remote scatter write, a remote read, a remote gather read, a stream write to a remote PMU, a stream write to remote DRAM, a host write, a host read, and/or a barrier operation.

A configurable unit in a tile works in its own address space (which may simply be a stream of ordered data in some cases), so to communicate with a resource outside of the tile which may utilize its own physical address space, one or more levels of address translation may be used to convert the address space of the configurable unit to the address space of the other resource. Much of this address translation may be performed by the Virtual Address Generator (VAG) in an Address Generation and Coalescing Unit (AGCU) 211-214, 221-224 in FIG. 2 or the AGCU 302 in FIG. 3A.

FIG. 4A is a block diagram depicting one example of a reconfigurable computing environment 400 wherein various implementations disclosed herein may be deployed. As depicted, the reconfigurable computing environment 400 includes a number of reconfigurable dataflow units (RDUs) 411-415, external memory blocks (DDR) 421-425, and an interconnection network 405 consisting of peer-to-peer (P2P) links 450-464 that couple pairs of RDUs. The interconnection network 405 may have other topologies and may include external routing devices in some implementations. The system 400 includes a host computer 401 which is connected to RDU-A 411 by link 440. The RDU-A 411 which is connected to the host 401 may be referred to as a gateway RDU. In other implementations, the host computer 401 may be connected to any number of the RDUs 411-415, using respective links to those RDUs. In at least one implementation, the host computer 401 is connected to every RDU in the reconfigurable computing environment 400, with RDU-B 412, RDU-C, 413, RDU-D 414, and RDU-E 415 each having a dedicated external interconnect (not shown) to the host 401.

In addition, a set of execution graphs 431-433 may be configured to run on the system 400. While the partitioning of the graphs 431-433 is statically depicted, one of skill in the art will appreciate that the executions graphs are likely not synchronous (i.e., of the same duration) and that the partitioning within a reconfigurable computing environment will likely be dynamic as execution graphs are completed and replaced. So, in the example shown, a first graph 431 is assigned to run on RDU-A 411 and utilize some of the resources of RDU-B 412. A second graph 432 is assigned to run on other resources of RDU-B 412 and RDU-C 413. RDU-D 414 and RDU-E 415 are configured to execute a third graph 433.

The RDUs 411-415 may include a grid of compute units and memory units interconnected with an array-level network such as those detailed elsewhere in this disclosure, such as in FIG. 3A. The RDUs 411-415 may also be provided with a high number of P2P ports (not explicitly shown in FIG. 4A) that interface with the P2P links 450-464. The provided P2P ports and links can provide a high degree of connectivity between the RDUs 411-415. Providing a high degree of connectivity can increase the dataflow bandwidth between the RDUs 411-415 and enable the RDUs 411-415 to cooperatively process large volumes of data via the dataflow operations specified in the execution graphs.

The P2P links 450-464 can utilize any appropriate high-speed communications standard, such as, but not limited to, PCIe, Ethernet, or Infiniband. One of skill in the art will appreciate that the bandwidth demand on the P2P links 450-464 may vary significantly over time (particularly as the partitioning changes over time) and is highly problem (i.e., execution graph) dependent. One of skill in the art will also appreciate that despite providing a high degree of connectivity between RDUs 411-415, the number of links 450-464 that directly connect any two cooperating RDUs 411-415 may not be sufficient to address the bandwidth demand. For example, the links that directly connect two cooperating RDUs (e.g., links 456, 457 between RDU-D 414 and RDU-E 415) may be too busy to support the additional dataflow bandwidth that is needed to keep the memory and compute units within those RDUs 411-415 fully utilized. In response to the above-described issue, the present disclosure enables providing additional bandwidth between cooperating RDUs 411-415 while preserving network resilience.

An RDU in the system 400 may be configured to send a P2P message to another RDU in the system 400. If there is a direct link between the two RDUs, the P2P message may be directly sent on that link from the initiating RDU to the target RDU. In some systems, the links of the RDUs in the system may be coupled to a switching fabric that can route the P2P message to the proper target RDU based on an address sent on the link. But in the system 400, there is no switching fabric. The RDUs 411-415 each have at least one link to every other RDU 411-415 in the system 400. So, by determining which link to use, an initiating RDU can send a P2P message directly to its intended target RDU. But if the direct link(s) between the initiating RDU and the target RDU are busy (or nonexistent in some implementations), the P2P route-through functionality can allow the initiating RDU to get the P2P message to its intended target RDU by passing through an intermediate RDU.

The example system 400 provides a single-link star network using links 460-464 and a double-link ring network using links 450-459. The double-link ring network provides two links between adjacent RDUs in the ring network while the single-link star network provides a direct connection between each pair of RDUs that are not adjacent to each other in the ring network. Other topologies are possible in other implementations and some implementations may not include a link between every possible pair of RDUs in the system.

FIG. 4B shows one example of a set of pass-through tables 402 in accordance with the reconfigurable computing system 400. Each column of the table in FIG. 4B represents a pass-through table for use by a single RDU 411-415 in the system 400. Thus, Table A is used by RDU-A 411, Table B is used by RDU-B 412, Table C is used by RDU-C 413, Table D is used by RDU D 414, and Table E is used by RDU-E 415. The table shows the port of the RDU that should be used to send traffic targeting the RDU of that row, and also includes the link that is connected to that port in system 400. Note that a pass-through table in an RDU only needs to know the port to which the packet should be sent; the link is implicit in the system configuration. The pass-through tables may be programmed based on the particular system configuration to achieve a specific system objective. There may be one pass-through table per RDU that is shared by each P-Shim, or there may be one pass-through table for each P-Shim. In implementations which provide separate pass-through tables for each P-Shim, the tables may be programmed with identical values for each P-Shim in an RDU, or may be independently programmed with different values, depending on the system objectives.

For example, the pass-through tables shown in FIG. 4B are configured to efficiently direct traffic in the specific system configuration shown in system 400 of FIG. 4A. Using the tables of FIG. 4B, RDUs in the system 400 can take traffic received through one external link that is directed to another RDU and send it out through a port that is directly connected to the other RDU through a link. Specifically, traffic intended for an RDU that is adjacent to the RDU in the ring network is directed onto a port in the appropriate direction namely CW1 or CCW2. Note that the system 400 of FIG. 4A has double-ring structure. By using the outer ring for clockwise traffic and the inner ring for counterclockwise traffic, congestion may be avoided, especially in larger systems where the RDUs do not have enough ports to connect to every other RDU in the ring. Traffic intended for an RDU that is not adjacent to the RDU in the ring network is directed through a port to a link in the star network to provide a direct path to that RDU.

So, as a non-limiting example, a packet may be sent to RDU-A 411 identifying RDU-C as the target with the appropriate address in DDR-C 423. RDU-A 411 receives the packet and notes that it is not the target for this packet. It uses Table A from FIG. 4B to determine that traffic targeted to RDU-C 413 should be sent out on the StarC port over link 460 so it sends the packet to RDU-C 413 which then can write the data to DDR-C 423.

The pass-through tables may be programmed at configuration time with data determined by the compiler and may be static throughout the execution of that particular configuration. The pass-through tables may be changed in a different configuration, depending on the needs of that configuration. The pass-through tables may be implemented as stand-alone tables or may be integrated into other tables containing additional data.

Figures 4C, 4D:
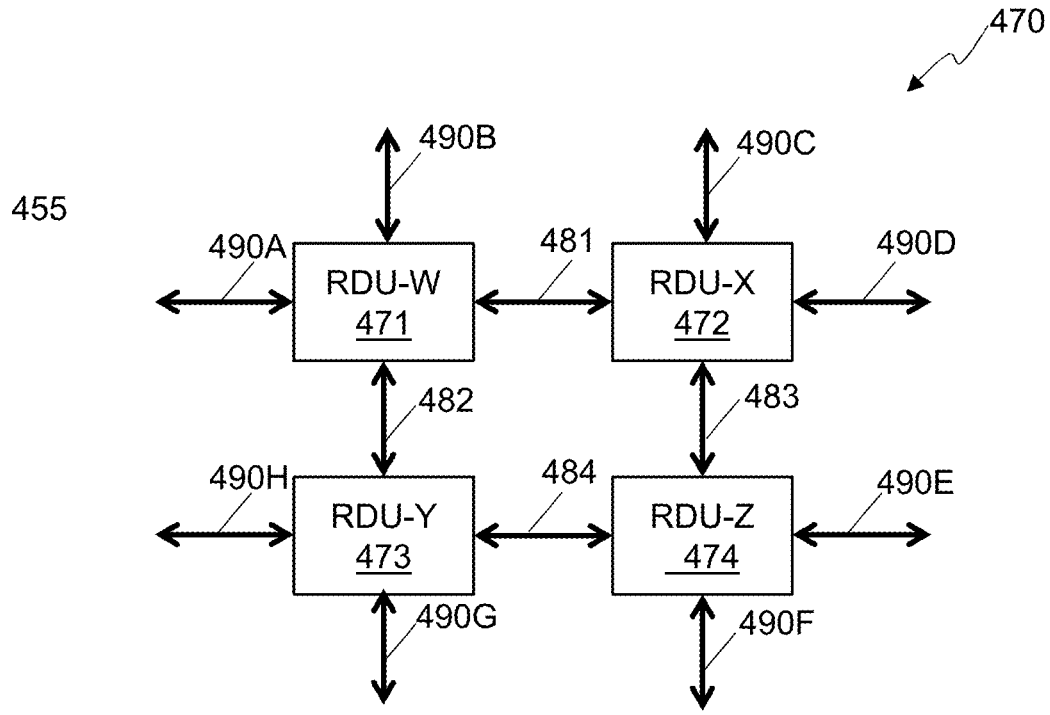
FIG. 4C shows another example system having an alternative configuration of RDUs.
FIG. 4D shows a set of example pass-through tables for use in the system of FIG. 4C.

FIG. 4C shows an example system 470 having an alternative configuration of RDUs 471-474 that may be a part of a mesh or hypercube configuration of RDUs. Each RDU 471-474 is shown with 4 ports (e.g., PCIe or Ethernet) to other RDUs, which may be referred to as a North port, a South port, an East port and a West port. Other implementations may have additional ports which may be used to connect to additional RDUs. In system 470, the East port of RDU-W 471 is coupled to the West port of RDU-X 472 by link 481, the East port of RDU-Y 473 is coupled to the West port of RDU-Z 474 by link 484, the South port of RDU-W 471 is coupled to the North port of RDU-Y 473 by link 482, and the South port of RDU-X 472 is coupled to the North port of RDU-Z 474 by link 483. Links 490A-H connect to the other ports of the RDUs 471-474 to allow communication to other RDUs or other computing resources. Note that memories may be attached to one or more of the RDUs 471-474, but they are not shown for clarity.

FIG. 4D shows a set of example pass-through tables 480 for use in the system 470. If a packet is received at an RDU for another RDU that has a shared link with that RDU, the packet is sent over the shared link to that RDU. But if a packet is received at an RDU for another RDU that does not have a shared link with that RDU, then the packet is routed through another port to an intermediate RDU which can then forward it to the target RDU.

As a non-limiting example, a packet that targets RDU-Z 474 may be received by RDU-W 471 through a link 490. RDU-W 471 accesses Table W to determine that packets for RDU-Z 474 should be sent out its South port, which is connected to link 482, so it sends the packet out of its South port over link 482 to RDU-Y 473. RDU-Y 473 receives the packet and accesses Table Y to determine that packets for RDU-Z 474 should be sent through its East port. The packet is then sent by RDU-Y 473 out of its East port over link 484 to RDU-Z 474 which consumes the packet.

Figure 5:
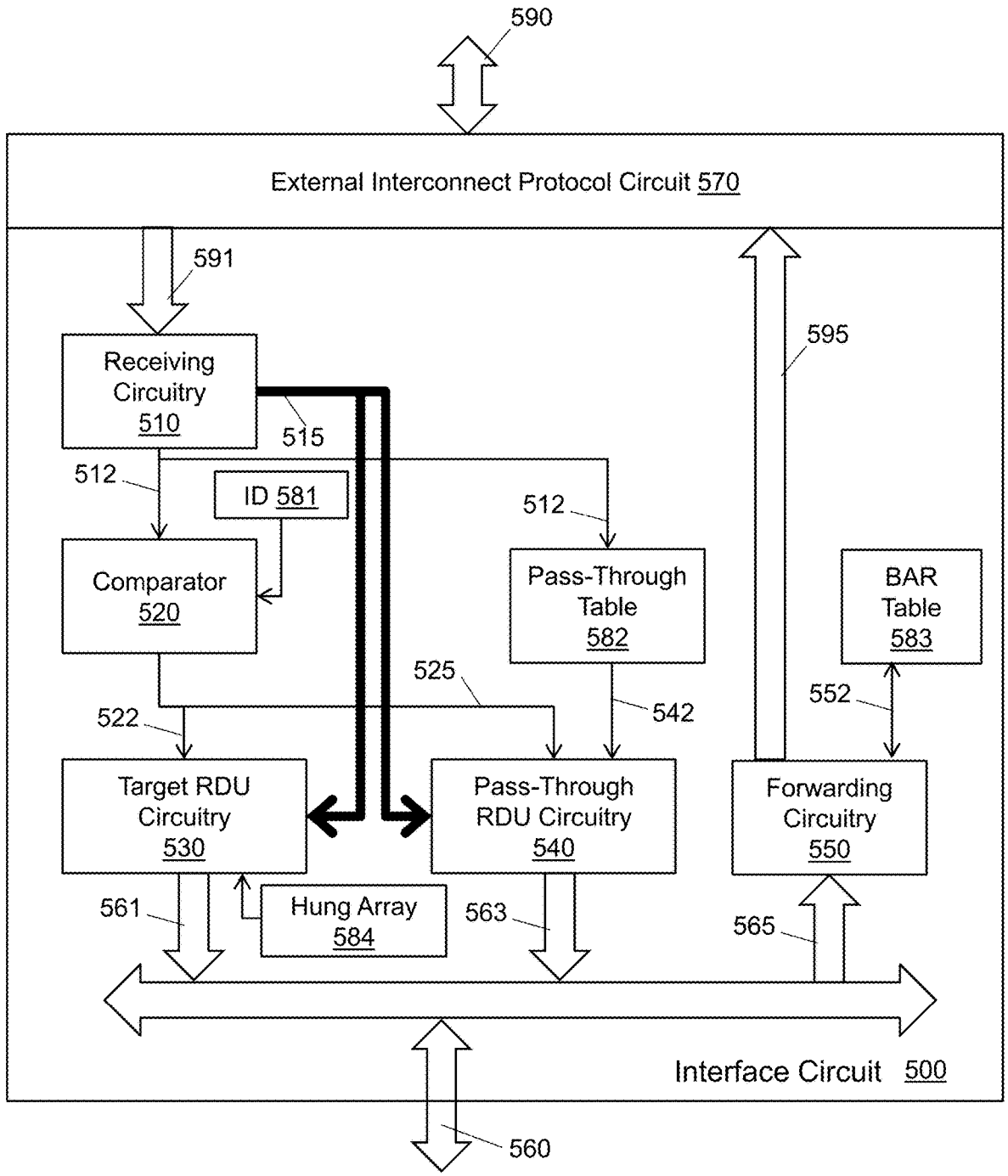
FIG. 5 is a block diagram of an example of an interface circuit in an RDU between a switching array fabric and an external interconnect.

FIG. 5 is a block diagram of an example of an interface circuit 500 in an RDU between a switching array fabric (or intra-RDU network or TLN) 560 and an external interconnect 590, such as a Peripheral Component Interconnect Express (PCIe) interconnect. The interface circuit 500 may be suitable for use as a P-Shim 256-258 as shown in RDU 110 in FIG. 2. In some implementations, protocol circuit 570 to handle the protocol of the external interface 590 may be included between the external interface 590 and the interface circuit 500.

The first interface circuit 500 can include receiving circuitry 510 to receive a first packet 591 from the first interconnect 590 and extract a target RDU identifier 512 from the first packet. The target RDU identifier 512 may be included in a packet header or may be embedded in the payload of the packet, depending on the implementation and in some cases, the type of transaction. A comparator 520 is included in the first interface circuit 500 to compare the target RDU identifier 512 to the first identifier which is stored in the identity (ID) register 581.

Target RDU circuitry 530 is included to communicate over the intra-RDU network 560 to a function interface of the one or more function interfaces in the RDU based on information 515 in the first packet in response to a determination 522 by the comparator 520 that the target RDU identifier 512 is equal to the first identifier. If the target RDU identifier 512 is equal to the first identifier from the ID register 581, then the packet 591 received over the external interconnect 590 is intended for a resource within the RDU so information from the packet 591 is sent as a transaction 561 on the intra-RDU network to an internal resource of the RDU. The packet may be for a remote write or remote read of memory attached to the RDU so the function interface may be a memory interface circuit coupled between the intra-RDU network and an external memory bus. For a remote read or remote write, the memory interface circuit is identified for communication over the intra-RDU network 560 based on a memory address provided with the first packet. For streaming write or SCTS, the function interface comprises an array interface circuit (e.g., an AGCU) coupled between the intra-RDU network 560 and the array level network of the array of configurable units and the array interface circuit is identified for communication over the intra-RDU network 560 based on an identifier of the array interface circuit provided in the first packet.

The interface circuit 500 includes pass-through RDU circuitry 540 to access the pass-through table 582 and retrieve the interface circuit identifier 542 for the target RDU identifier 512. In response to a determination 525 by the comparator 520 that the target RDU identifier 512 is not equal to the first identifier, the pass-through RDU circuitry 540 can send the target RDU identifier 512 and other information 515 from the first packet to the second interface circuit as a transaction 563 over the intra-RDU network 560.

Forwarding circuitry 550 in the interface circuit 500 is used to receive the target RDU identifier and the other information 565 from the first packet over the intra-RDU network 560 from another interface circuit of the RDU. The forwarding circuitry 550 then creates a second packet 595 based on the target RDU identifier and other information 515 from the first packet and sends the second packet over the second external interconnect. In some implementations where the external interconnect 590 uses an address, such as PCIe, the forwarding circuitry 550 determines an address 552 for a second RDU that is also coupled to the external interconnect 590 and uses the address 552 for the second RDU to send the second packet 595 to the second RDU over the external interconnect 590. The forwarding circuitry 550 can use any type of circuitry to determine the address for the second RDU, including but not limited to, as a register to hold the address for the second RDU or a base address register table 583 to provide addresses for a plurality of other RDUs, including the second RDU. Depending on the details of the first packet 591, the target RDU may identify the second RDU, but the target RDU may be a third RDU with the second packet simply passing through the second RDU. But in either case, the address used may be for the second RDU.

The interface circuit 500, including the receiving circuitry 510, the target RDU circuitry 530, the pass-through RDU circuitry 540 and the forwarding circuitry 550 can recognize various transaction types for the first packet 591 which may be organized in different ways to provide the information for the packet 591, such as the target RDU identifier, a target on the intra-RDU interface, and addressing information. The interface circuit 500 can be capable to recognize transaction types of a stream write to a first configurable memory unit in the array of configurable units, a stream clear to send (SCTS) to a second configurable memory unit in the array of configurable units, a remote write to a memory controller of the RDU, a remote read request to the memory controller of the RDU, a remote read completion to a third configurable memory unit in the array of configurable units, a barrier request, and a barrier completion to a fourth configurable memory unit in the array of configurable units.

Implementations may include a hung array bit 584 to indicate that communication with the array of configurable units should be suppressed. This may be due to a hung array level network in the array or other causes rendering the array of configurable units incapable of further action without being reset or reloaded. The target RDU circuitry 530 may further include circuitry to evaluate the hung array bit 584 and in response to the hung array bit 584 being set with the target RDU identifier 512 equal to the first identifier 581 and the intra-RDU target being an identifier for the array interface in the array of configurable units, sending a response to the first packet 591 back on the first external interface 590 without communication with the array interface over the intra-RDU network 560.

Figure 6:
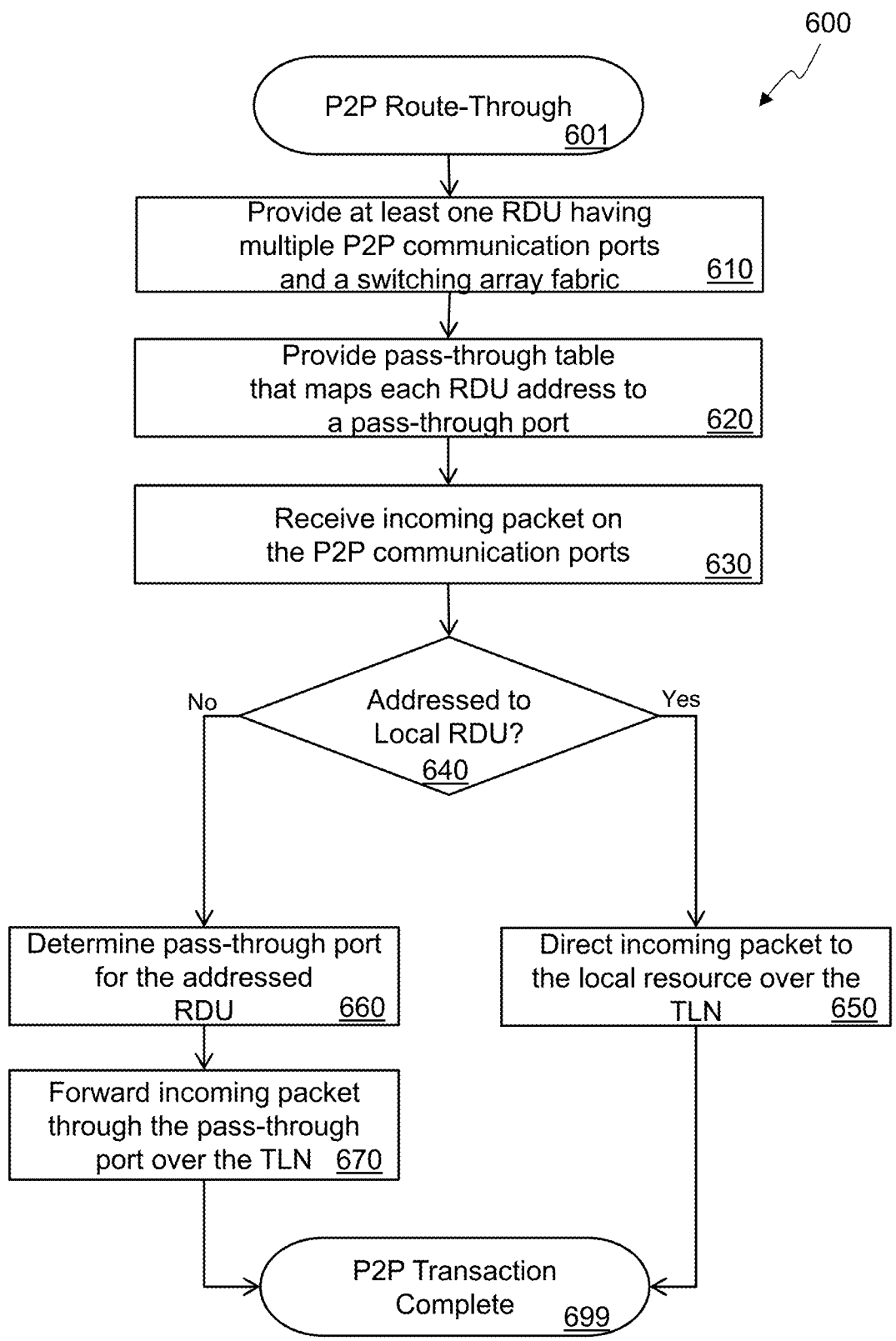
FIG. 6 is a flowchart depicting one example of a peer-to-peer (P2P) routing method.

FIG. 6 is a flowchart depicting one example of a peer-to-peer (P2P) routing method 600. As depicted, the P2P routing method 600 implements a P2P route-through 601 and includes providing (610) at least one RDU, providing (620) a pass-through table, receiving (630) an incoming packet, determining (640) whether the packet is address to the local RDU, directing (650) the incoming packet to the local RDU, determining (660) the pass-through port for the addressed RDU, and forwarding (670) the incoming packet through the pass-through port. This may complete (699) the pass-through operation. The P2P routing method 600 may be conducted by hardware and/or software modules executing within each RDU. While the depicted method is written from the perspective of a single incoming packet, one of skill in the art will appreciate that the method can be applied to a stream of incoming packets.

Providing (610) at least one RDU may include providing one or more RDUs that are configured to execute at least one instruction graph. Each of the instruction graphs may indicate execution dependencies. Each RDU may have multiple peer-to-peer (P2P) communication ports that are internally interconnected to each other and to a grid of compute units and memory units via a switching array fabric (e.g., a TLN as shown in FIG. 2). Each of the RDUs may have a unique RDU address that facilitates sending messages to specific RDUs. Providing (620) a pass-through table such as that shown in FIG. 4B may include providing configuration data that enables mapping each RDU address to a selected port of the plurality of P2P communication ports.

Receiving (630) an incoming packet may include receiving a packet on one of the P2P communication ports. Determining (640) whether the packet is addressed to the local RDU may include determining if the incoming packet is addressed to the RDU that is receiving or has received the packet. If the packet is not addressed to the local RDU, the method proceeds by determining (660) the pass-through port for the addressed RDU. This may be accomplished using the pass-through table in some implementations. If the packet is addressed to the local RDU, the method proceeds by directing (650) the incoming packet to the local RDU.

Directing (650) the incoming packet to the local RDU may include directing the incoming packet to a configurable unit such as a compute unit or memory unit referenced in the incoming packet. The incoming packet may be directed to the referenced configurable unit via the switching array fabric.

Determining (660) the pass-through port for the addressed RDU may include using configuration data to map the RDU address to a specified P2P port. Forwarding (670) the incoming packet through the pass-through port may include forwarding the received packet through the indicated P2P port via the switching array fabric (e.g., the TLN).

Figure 7:
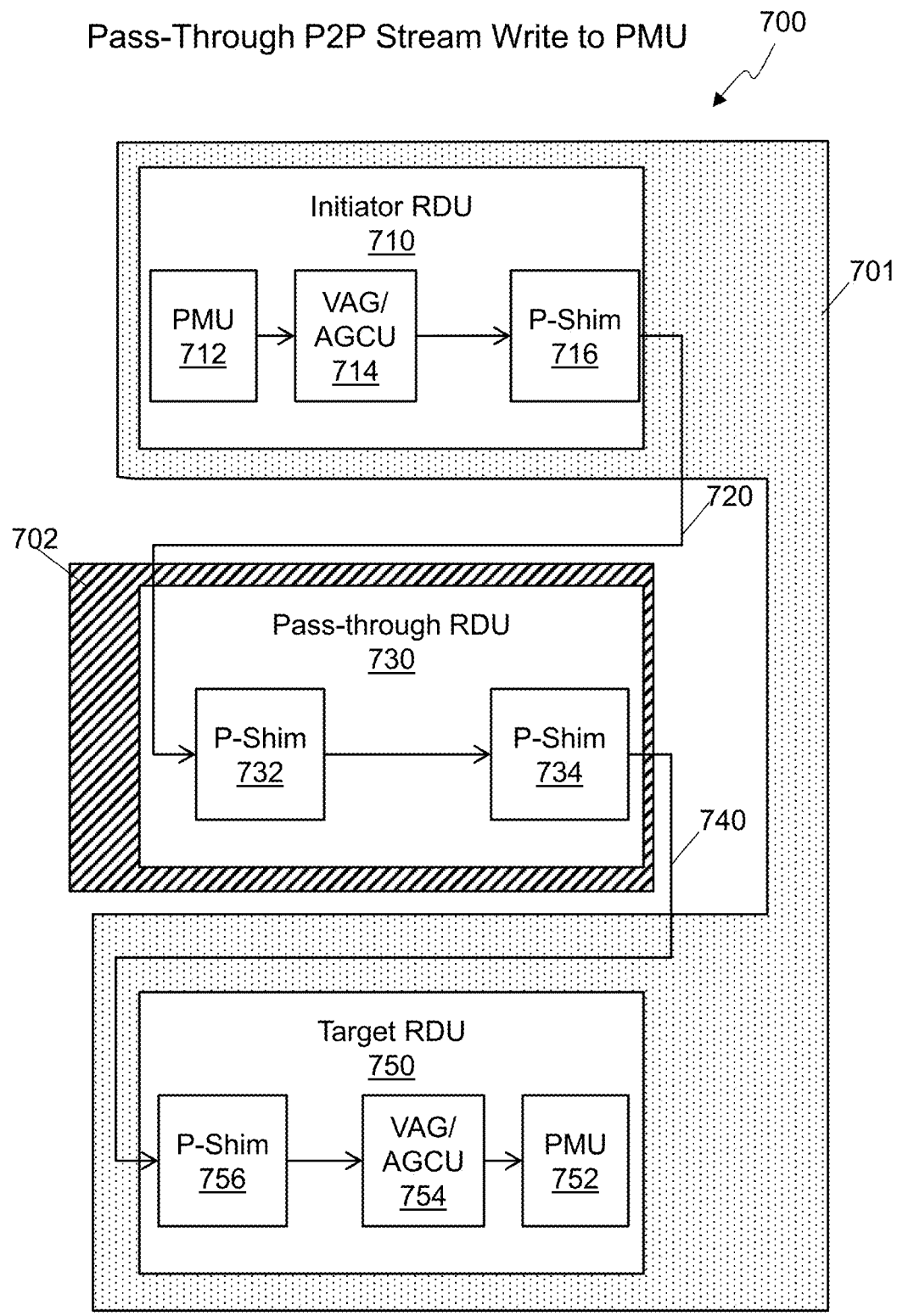
FIG. 7 is a flow diagram of a pass-through P2P stream write.

FIG. 7 is a flow diagram 700 of a pass-through P2P stream write. The system may be executing two separate graphs 701, 702 that are mapped to at least three RDUs 710, 730, 750. The first graph may be assigned to an initiator RDU 710 that wants to send a P2P stream write to a target RDU 750. A second graph may be executing on another RDU 730. For a variety of reasons, depending on the architecture of the links between the RDUs 710, 730, 750 and the current state of the links, the initiator RDU 710 may not be able to send the stream write over a direct link to the target RDU 750. Since it is unable to send the stream write directly to the target RDU, it may send the stream write addressed to the target RDU 750 to the pass-through RDU 730 over a link 720.

In the example of a streaming write from an initiator RDU 710 to a target RDU 750 using the P2P protocol, the initiator PMU 712 is configured to perform a store to a target PMU 752. The stream write P2P protocol can be useful for a producer/consumer model. It provides a FIFO interface between two PMUs 712, 752 in two different RDUs 710, 750 where one PMU 712 is an initiator, and the other PMU 752 is a target.

To configure the initiator RDU 710, the initiator PMU 712 (in the initiator RDU 710) is configured to send data over the array level network (ALN) to a VAG 714 in a local AGCU of its tile. The initiator virtual address generator (VAG) 714 is preconfigured with a virtual target RDU ID, a virtual target VAG/AGCU ID, and other metadata related to the transaction. The source VAG 714 may translate the virtual target RDU ID and virtual target VAG/AGCU ID to a physical target RDU ID and physical target VAG/AGCU ID in AGCU 414. Some implementations may not perform a virtual to physical translation or may perform the virtual to physical address translation in another block, such as P-Shim 716 or P-Shim 756. The P-Shim ID for the initiator P-Shim 716 is retrieved from the P-Shim Steering register and used for the destination address (DA) and the physical target RDU ID and physical target VAG/AGCU ID are used as to generate a physical address (PA) for the TLN of the initiator RDU 710 to send the stream write message over the TLN from the initiator VAG/AGCU 714 to the initiator P-Shim 716.

Once the TLN transaction reaches the P-Shim 716, it uses the Base Address Register (BAR) address for the RDU 730 coupled to its link but embeds the actual target RDU ID in the TLP transaction sent over the PCIe link 720. In some cases, the target RDU ID is included in both the PCIe address and the P2P header. The P-Shim 716 generates a PCIe address and encapsulates the data from the source PMU 712, along with the destination VAG/AGCU information and other information as described earlier, into a P2P header which is then made a part of a TLP packet on PCIe that includes the data and then transmits the TLP packet over the PCIe link 720 to the pass-through RDU 730.

The pass-through RDU 730 claims the PCIe TLP packet by decoding the PCIe address and compares the embedded target RDU ID to its own ID to determine if it is the actual target of the P2P transaction. Since, in this case, the two IDs do not match, the receiving P-Shim 732 of the pass-through RDU 730 accesses its pass-through table (such as a table shown FIG. 4B) to determine the next hop P-Shim 734 and then sends the stream write P2P transaction across the pass-through RDU's TLN to the next hop P-Shim 734. The next hop P-Shim 734 constructs a new PCIe address for its link 740 using the base address of its connected RDU and a new P2P header to create another PCIe TLP packet which is sent over the link 740 to the target RDU 750.

The target RDU 750 claims the PCIe TLP packet by decoding the PCIe address and compares the embedded target RDU ID to its own ID to determine if it is the actual target of the P2P transaction. This time, the two IDs match, so the P-Shim 756 uses the P2P header information to determine what kind of packet it is. In this example, it determines that this is a stream write packet, and it will send that packet to the target VAG 754 identified in the packet. The target VAG 754 is pre-programmed to know that stream write packets arriving at that destination VAG are to be sent to a specific target PMU 752 on that RDU 750. The VAG 754, as it receives packets over the TLN from the P-Shim 756, sends the data to the target PMU 752 to complete the transfer from the source PMU 712 to the target PMU 752. Note that if a remote write to an external memory connected to the Target RDU 750 has been used instead of a streaming write, the P-Shim 756 would recognize this and send the packets to the appropriate D-Shim over the TLN.

As will be appreciated by those of ordinary skill in the art, aspects of the various implementations may be embodied as a system, device, method, or computer program product apparatus. Accordingly, elements of the present disclosure may take the form of an entirely hardware implementation, an entirely software implementation (including firmware, resident software, micro-code, or the like) or an implementation combining software and hardware aspects that may all generally be referred to herein as a "apparatus," "server," "circuitry," "module," "client," "computer," "logic," "FPGA," "CGRA IC," "system," or other terms. Furthermore, aspects of the various implementations may take the form of a computer program product embodied in one or more computer-readable medium(s) having computer program code stored thereon. The phrases "computer program code" and "instructions" both explicitly include configuration information for an FPGA/CGRA IC or other programmable logic as well as traditional binary computer instructions, and the term "processor" explicitly includes logic in an FPGA/CGRA IC or other programmable logic configured by the configuration information in addition to a traditional processing core, such as one in a central processing unit (CPU) or graphics processing unit (GPU). Furthermore, "executed" instructions explicitly includes electronic circuitry of an FPGA/CGRA IC or other programmable logic performing the functions for which they are configured by configuration information loaded from a storage medium as well as serial or parallel execution of instructions by a traditional processing core.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain or store a program and/or data for use by or in connection with an instruction execution system, apparatus, or device. Even if the data in the computer-readable storage medium requires action to maintain the storage of data, such as in a traditional semiconductor-based dynamic random-access memory, the data storage in a computer-readable storage medium can be considered to be non-transitory. A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

Computer program code for carrying out operations for aspects of various implementations may be written in any combination of one or more programming languages, including object-oriented programming languages such as Java, Python, C++, or the like, conventional procedural programming languages, such as the "C" programming language or similar programming languages, or low-level computer languages, such as assembly language or microcode. In addition, the computer program code may be written in Verilog, VHDL or another hardware description language to generate configuration instructions for an FPGA/CGRA IC or other programmable logic. The computer program code, if converted into an executable form and loaded onto a computer, FPGA/CGRA IC, or other programmable apparatus, produces a computer implemented method. The instructions which execute on the computer, FPGA/CGRA IC, or other programmable apparatus may provide the mechanism for implementing some or all of the functions/acts specified in the flowchart and/or block diagram block or blocks. In accordance with various implementations, the computer program code may execute entirely on the user's device, partly on the user's device and partly on a remote device, or entirely on the remote device, such as a cloud-based server. In the latter scenario, the remote device may be connected to the user's device through any type of network, including a local area network (LAN) or a wide area network (WAN), or the connection may be made to an external computer (for example, through the Internet using an Internet Service Provider). The computer program code stored in/on (i.e., embodied therewith) the non-transitory computer-readable medium is comprised by an article of manufacture.

The computer program code, if executed by a processor, causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So, a processor programmed to perform a task is transformed from what the processor was before being programmed to perform that task, much like a physical plumbing system with different valves can be controlled to change the physical flow of a fluid.

Example of implementations are provided below:

Example 1. A reconfigurable dataflow unit (RDU) comprising: an intra-RDU network; a first interface circuit coupled between the intra-RDU network and a first external interconnect external to the RDU, wherein the RDU is a first RDU; a second interface circuit coupled between the intra-RDU network and a second external interconnect external to the first RDU; a third interface circuit coupled between the intra-RDU network and a third external interconnect external to the first RDU; an array of configurable units having a coarse grain reconfigurable architecture and including a plurality of configurable processing units and a plurality of configurable memory units connected by an array level network; one or more function interfaces that respectively provide a connection between the intra-RDU network and the array level network or another functional unit of the first RDU; an identity register to store a first identifier for the first RDU; and a pass-through table to store an interface circuit identifier for each of a plurality of other RDU identifiers, the interface circuit identifier capable of identifying one of at least the second interface circuit and the third interface circuit; the first interface circuit comprising: receiving circuitry to receive a first packet from the first external interconnect and extract a target RDU identifier from the first packet; a comparator to compare the target RDU identifier to the first identifier; target RDU circuitry to communicate over the intra-RDU network to a function interface of the one or more function interfaces based on information in the first packet in response to a determination by the comparator that the target RDU identifier is equal to the first identifier; and pass-through RDU circuitry to access the pass-through table and retrieve the interface circuit identifier for the target RDU identifier and, in response to a determination by the comparator that the target RDU identifier is not equal to the first identifier, send the target RDU identifier and other information from the first packet to the second interface circuit over the intra-RDU network, wherein the interface circuit identifier for the target RDU identifier is equal to an identifier for the second interface circuit.

Example 2. The RDU of example 1, wherein the intra-RDU network comprises a switching array fabric.

Example 3. The RDU of example 1, wherein the RDU is implemented on a single integrated circuit die, or the RDU comprises two or more integrated circuit dies mounted in a multi-die package.

Example 4. The RDU of example 1, wherein the function interface is an array interface between the intra-RDU network and the array level network of the array of configurable units.

Example 5. The RDU of example 1, the second interface circuit comprising forwarding circuitry to receive the target RDU identifier and the other information from the first packet over the intra-RDU network, create a second packet based on the target RDU identifier and other information from the first packet, and send the second packet over the second external interconnect.

Example 6. The RDU of example 5, wherein the second external interconnect is coupled to a second RDU, the forwarding circuitry further comprising circuitry to determine an address for the second RDU and to use the address for the second RDU to send the second packet to the second RDU over the second external interconnect.

Example 7. The RDU of example 6, wherein the target RDU identifier identifies the second RDU.

Example 8. The RDU of example 6, wherein the target RDU identifier identifies a third RDU that is different than the second RDU.

Example 9. The RDU of example 6, wherein the circuitry to determine an address for the second RDU comprises a base address register table to provide addresses for a plurality of other RDUs, including the second RDU.

Example 10. The RDU of example 6, wherein the circuitry to determine an address for the second RDU comprises a register to hold the address for the second RDU.

Example 11. The RDU of example 1, wherein the function interface comprises a memory interface circuit coupled between the intra-RDU network and an external memory bus; wherein the memory interface circuit is identified for communication over the intra-RDU network based on a memory address provided with the first packet.

Example 12. The RDU of example 1, wherein the function interface comprises an array interface circuit coupled between the intra-RDU network and the array level network of the array of configurable units; wherein the array interface circuit is identified for communication over the intra-RDU network based on an identifier of the array interface circuit provided in the first packet.

Example 13. The RDU of example 1, wherein the first external interconnect, the second external interconnect, and the third external interconnect are each Peripheral Component Interconnect Express (PCIe) interconnects.

Example 14. The RDU of example 1, the first interface circuit further comprising a hung array bit to indicate that communication with the array of configurable units over the intra-RDU network should be suppressed; the target RDU circuitry further comprising circuitry to evaluate the hung array bit and in response to the hung array bit being set with the target RDU identifier equal to the first identifier and the function interface being an identifier for an array interface in the array of configurable units, sending a response to the first packet back on the first external interconnect without communicating over the intra-RDU network.

Example 15. The RDU of example 1, the first packet also including a transaction type with the first interface circuit capable to recognize transaction types of: a stream write to a first configurable memory unit in the array of configurable units; a stream clear to send (SCTS) to a second configurable memory unit in the array of configurable units; a remote write to a memory controller of the RDU; a remote read request to the memory controller of the RDU; a remote read completion to a third configurable memory unit in the array of configurable units; a barrier request; and a barrier completion to a fourth configurable memory unit in the array of configurable units.

Example 16. A method for routing packets in a computing system that includes three or more reconfigurable dataflow units (RDUs) each having a coarse grain reconfigurable architecture, the method comprising: receiving, over a first external interconnect at a first interface circuit of a first RDU of the three or more RDUs, a first packet; extracting a target RDU identifier from the first packet; determining whether the target RDU identifier identifies the first RDU; in response to determining that the target RDU identifier identifies the first RDU, communicating over a switching array fabric of the first RDU to a function interface of the first RDU identified in the first packet to perform a transaction indicated by the first packet; and in response to determining that the target RDU identifier does not identify the first RDU, accessing a pass-through table to retrieve an interface circuit identifier for the target RDU identifier that identifies a second interface of the first RDU coupled to a second external interconnect that is also coupled to a second RDU of the three or more RDUs, and sending the target RDU identifier and other information from the first packet to the second interface over the switching array fabric of the first RDU.

Example 17. The method of example 16, wherein the first external interconnect and the second external interconnect are each Peripheral Component Interconnect Express (PCIe) interconnects.

Example 18. The method of example 16, further comprising: identifying a memory interface circuit coupled between the switching array fabric and an external memory bus as the function interface based on an address provided with the first packet; sending a transaction type extracted from the first packet and the address from the first interface circuit to the memory interface circuit as a part of the communicating over the switching array fabric; and accessing external memory coupled to the external memory bus, by the memory interface circuit, based on the transaction type and the address.

Example 19. The method of example 16, further comprising: identifying an array interface circuit coupled between the switching array fabric and an array level network of an array of configurable units comprising a plurality of configurable memory units and a plurality of processing units coupled together by the array level network as the function interface based on an identifier in the first packet; sending a transaction type extracted from the first packet to the array interface circuit as a part of the communicating over the switching array fabric; and communicating, by the array interface circuit, with a configurable memory unit in the array of configurable units over the array level network based on the transaction type, wherein an identity of the configurable memory unit is pre-configured in the array interface circuit.

Example 20. The method of example 16, further comprising: receiving, at the second interface of the first RDU over the switching array fabric, the target RDU identifier and the other information from the first packet; creating, in the second interface, a second packet based on the target RDU identifier and other information from the first packet; and sending the second packet over the second external interconnect to the second RDU.

Example 21. The method of example 20, wherein the target RDU identifier identifies the second RDU.

Example 22. The method of example 20, wherein the target RDU identifier identifies a third RDU that is different than the second RDU.

Example 23. The method of example 20, further comprising: obtaining an address for the second RDU; and using the address for the second RDU to send the second packet to the second RDU over the second external interconnect.

Example 24. The method of example 23, further comprising: obtaining the address for the second RDU from a base address register table that includes addresses for a plurality of other RDUs, including the second RDU.

Example 25. The method of example 23, further comprising: obtaining the address for the second RDU from a base address register that is pre-configured to store the address for the second RDU.

Example 26. A method for routing packets in a computing system that includes three or more reconfigurable dataflow units (RDUs) including a first RDU and a second RDU, each RDU of the three or more RDUs including a switching array fabric, an array of configurable units having a coarse grain reconfigurable architecture with an interface to the switching array fabric, and a plurality of interface units coupled between the switching array fabric and a respective external interface, the first RDU coupled to a first external interconnect through a first interface of the plurality of interface units of the first RDU and a second external interconnect through a second interface of the plurality of interface units of the first RDU, and the second RDU is also coupled to the second external interconnect through a third interface unit of the plurality of interface units of the second RDU, the method comprising: receiving, over the first external interconnect at the first RDU, a first packet; extracting a target RDU identifier from the first packet; determining whether the target RDU identifier identifies the first RDU; in response to determining that the target RDU identifier identifies the first RDU, sending a payload from the first packet over the switching array fabric to an intra-RDU target identified in the first packet; and in response to determining that the target RDU identifier does not identify the first RDU, accessing a pass-through table to retrieve an interface circuit identifier for the target RDU identifier, wherein the interface circuit identifier identifies the second interface, and sending the target RDU identifier, an identifier of the intra-RDU target, and the payload to an interface on the switching array fabric of the first RDU identified by the interface circuit identifier.

Example 27. A computing system comprising three or more reconfigurable dataflow units (RDUs), each RDU of the three or more RDUs comprising: an intra-RDU network; an array of configurable units having a coarse grain reconfigurable architecture and including a plurality of configurable processing units and a plurality of configurable memory units connected by an array level network and an array interface circuit that provides a connection between the array level network and the intra-RDU network; memory interface circuit coupled between the intra-RDU network and an external memory bus; a plurality of external interconnects, each external interconnect of the plurality of external interconnects coupled to a respective port interface circuit in the RDU that is also coupled to the intra-RDU network; an identity register to store an identifier for the RDU; and a pass-through table to store a target port interface circuit identifier for each of a plurality of RDU identifiers; each port interface circuit of the respective port interface circuits of an RDU of the three or more RDUs respectively comprising: receiving circuitry to receive a first packet from its respective external interconnect and extract a first target RDU identifier from the first packet; a comparator to compare the first target RDU identifier to the identifier stored in the identity register; target RDU circuitry to communicate over the intra-RDU network to the array interface circuit or the memory interface circuit based on information in the first packet in response to a determination by the comparator that the first target RDU identifier is equal to the identifier; pass-through RDU circuitry to access the pass-through table and retrieve the target port interface circuit identifier for the first target RDU identifier and, in response to a determination by the comparator that the first target RDU identifier is not equal to the identifier, send the first target RDU identifier and other information from the first packet to a port interface circuit of the RDU identified by the target port interface circuit identifier over the intra-RDU network; and forwarding circuitry to receive a second target RDU identifier and other information over the intra-RDU network, create a second packet carrying the second target RDU identifier and the other information, and send the second packet over the respective external interconnect.

Example 28. The computing system of example 27, wherein each RDU of a set of RDUs out of the three or more RDUs is connected to each other RDU in the set of RDUs through a respective external interconnect of the plurality of external interconnects.

Example 29. The computing system of example 28, wherein the set of RDUs is organized in a ring topology and each RDU in the set of RDUs is also connected to each adjacent RDU in the ring topology through a second respective external interconnect of the plurality of external interconnects so that there are two interface circuits coupling adjacent RDUs in the ring topology.

Example 30. The computing system of example 29, wherein the pass-through table is configured create counter-rotating dataflow rings using the two interface circuits coupling adjacent RDUs in the ring topology.

Example 31. The computing system of example 27, wherein a set of RDUs out of the three or more RDUs is organized in a ring topology with each RDU in the set of RDUs connected to each adjacent RDU in the ring topology through a respective external interconnect of the plurality of external interconnects.

Example 32. The computing system of example 31, wherein the set of RDUs is located on a single printed circuit board.

Example 33. The computing system of example 27, further comprising a host computer connected to a gateway RDU of the three or more RDUs through an external interconnect of the plurality of external interconnects of the gateway RDU that is not connected to another RDU of the three or more RDUs; wherein each RDU in the three or more RDUs is connected to at least one other RDU in the three or more RDUs by an external interconnect of the plurality of external interconnects and has a path through one or more external interconnects and other RDUs of the three or more RDUs to the host computer.

Example 34. The computing system of example 27, wherein each external interconnect of the plurality of external interconnects comprises a Peripheral Component Interconnect Express (PCIe) interconnect.

Example 35. The computing system of example 27 further comprising a host computer connected to one or more of the three or more RDUs through respective external interconnects of the plurality of external interconnects of the three or more RDUs.

As used in this specification and the appended claims, the singular forms "a", "an", and "the" include plural referents unless the content clearly dictates otherwise. Furthermore, as used in this specification and the appended claims, the term "or" is generally employed in its sense including "and/or" unless the content clearly dictates otherwise. As used herein, the term "coupled" includes direct and indirect connections. Moreover, where first and second devices are coupled, intervening devices including active devices may be located there between.

The description of the various implementations provided above is illustrative in nature and is not intended to limit this disclosure, its application, or uses. Thus, different variations beyond those described herein are intended to be within the scope of implementations. Such variations are not to be

We claim as follows:

1. A reconfigurable dataflow unit (RDU) comprising:
   an intra-RDU network;
   a first interface circuit coupled between the intra-RDU network and a first external interconnect external to the RDU, wherein the RDU is a first RDU;
   a second interface circuit coupled between the intra-RDU network and a second external interconnect external to the first RDU;
   a third interface circuit coupled between the intra-RDU network and a third external interconnect external to the first RDU;
   an array of configurable units having a coarse grain reconfigurable architecture and including a plurality of configurable processing units and a plurality of configurable memory units connected by an array level network;
   one or more function interfaces that respectively provide a connection between the intra-RDU network and the array level network or another functional unit of the first RDU;
   an identity register to store a first identifier for the first RDU; and
   a pass-through table to store an interface circuit identifier for each of a plurality of other RDU identifiers, the interface circuit identifier capable of identifying one of at least the second interface circuit and the third interface circuit;
   the first interface circuit comprising:
      receiving circuitry to receive a first packet from the first external interconnect and extract a target RDU identifier from the first packet;
      a comparator to compare the target RDU identifier to the first identifier;
      target RDU circuitry to communicate over the intra-RDU network to a function interface of the one or more function interfaces based on information in the first packet in response to a determination by the comparator that the target RDU identifier is equal to the first identifier; and
      pass-through RDU circuitry to access the pass-through table and retrieve the interface circuit identifier for the target RDU identifier and, in response to a determination by the comparator that the target RDU identifier is not equal to the first identifier, send the target RDU identifier and other information from the first packet to the second interface circuit over the intra-RDU network, wherein the interface circuit identifier for the target RDU identifier is equal to an identifier for the second interface circuit.

2. The RDU of claim 1, wherein the RDU is implemented on a single integrated circuit die, or the RDU comprises two or more integrated circuit dies mounted in a multi-die package.

3. The RDU of claim 1, the second interface circuit comprising forwarding circuitry to receive the target RDU identifier and the other information from the first packet over the intra-RDU network, create a second packet based on the target RDU identifier and other information from the first packet, and send the second packet over the second external interconnect.

4. The RDU of claim 3, wherein the second external interconnect is coupled to a second RDU, the forwarding circuitry further comprising circuitry to determine an address for the second RDU and to use the address for the second RDU to send the second packet to the second RDU over the second external interconnect.

5. The RDU of claim 4, wherein the circuitry to determine an address for the second RDU comprises a base address register table to provide addresses for a plurality of other RDUs, including the second RDU.

6. The RDU of claim 4, wherein the circuitry to determine an address for the second RDU comprises a register to hold the address for the second RDU.

7. The RDU of claim 1, wherein the function interface comprises a memory interface circuit coupled between the intra-RDU network and an external memory bus;
   wherein the memory interface circuit is identified for communication over the intra-RDU network based on a memory address provided with the first packet.

8. The RDU of claim 1, wherein the function interface comprises an array interface circuit coupled between the intra-RDU network and the array level network of the array of configurable units;
   wherein the array interface circuit is identified for communication over the intra-RDU network based on an identifier of the array interface circuit provided in the first packet.

9. The RDU of claim 1, the first interface circuit further comprising a hung array bit to indicate that communication with the array of configurable units over the intra-RDU network should be suppressed;
   the target RDU circuitry further comprising circuitry to evaluate the hung array bit and in response to the hung array bit being set with the target RDU identifier equal to the first identifier and the function interface being an identifier for an array interface in the array of configurable units, sending a response to the first packet back on the first external interconnect without communicating over the intra-RDU network.

10. The RDU of claim 1, the first packet also including a transaction type with the first interface circuit capable to recognize transaction types of:
    a stream write to a first configurable memory unit in the array of configurable units;
    a stream clear to send (SCTS) to a second configurable memory unit in the array of configurable units;
    a remote write to a memory controller of the RDU;
    a remote read request to the memory controller of the RDU;
    a remote read completion to a third configurable memory unit in the array of configurable units;
    a barrier request; and
    a barrier completion to a fourth configurable memory unit in the array of configurable units.

11. A method for routing packets in a computing system that includes three or more reconfigurable dataflow units (RDUs) each having a coarse grain reconfigurable architecture, the method comprising:
    receiving, over a first external interconnect at a first interface circuit of a first RDU of the three or more RDUs, a first packet;
    extracting a target RDU identifier from the first packet;
    determining whether the target RDU identifier identifies the first RDU;
    in response to determining that the target RDU identifier identifies the first RDU, communicating over a switching array fabric of the first RDU to a function interface of the first RDU identified in the first packet to perform a transaction indicated by the first packet; and in response to determining that the target RDU identifier does not identify the first RDU, accessing a pass-through table to retrieve an interface circuit identifier for the target RDU identifier that identifies a second interface of the first RDU coupled to a second external interconnect that is also coupled to a second RDU of the three or more RDUs, and sending the target RDU identifier and other information from the first packet to the second interface over the switching array fabric of the first RDU.

12. The method of claim 11, further comprising:

identifying a memory interface circuit coupled between the switching array fabric and an external memory bus as the function interface based on an address provided with the first packet;

sending a transaction type extracted from the first packet and the address from the first interface circuit to the memory interface circuit as a part of the communicating over the switching array fabric; and accessing external memory coupled to the external memory bus, by the memory interface circuit, based on the transaction type and the address.

13. The method of claim 11, further comprising:

identifying an array interface circuit coupled between the switching array fabric and an array level network of an array of configurable units comprising a plurality of configurable memory units and a plurality of processing units coupled together by the array level network as the function interface based on an identifier in the first packet;

sending a transaction type extracted from the first packet to the array interface circuit as a part of the communicating over the switching array fabric; and communicating, by the array interface circuit, with a configurable memory unit in the array of configurable units over the array level network based on the transaction type, wherein an identity of the configurable memory unit is pre-configured in the array interface circuit.

14. The method of claim 11, further comprising:

receiving, at the second interface of the first RDU over the switching array fabric, the target RDU identifier and the other information from the first packet;

creating, in the second interface, a second packet based on the target RDU identifier and other information from the first packet; and sending the second packet over the second external interconnect to the second RDU.

15. The method of claim 14, further comprising:

obtaining an address for the second RDU; and using the address for the second RDU to send the second packet to the second RDU over the second external interconnect.

16. A computing system comprising three or more reconfigurable dataflow units (RDUs), each RDU of the three or more RDUs comprising:

an intra-RDU network;

an array of configurable units having a coarse grain reconfigurable architecture and including a plurality of configurable processing units and a plurality of configurable memory units connected by an array level network and an array interface circuit that provides a connection between the array level network and the intra-RDU network;

memory interface circuit coupled between the intra-RDU network and an external memory bus;

a plurality of external interconnects, each external interconnect of the plurality of external interconnects coupled to a respective port interface circuit in the RDU that is also coupled to the intra-RDU network;

an identity register to store an identifier for the RDU; and a pass-through table to store a target port interface circuit identifier for each of a plurality of RDU identifiers;

each port interface circuit of the respective port interface circuits of an RDU of the three or more RDUs respectively comprising:

receiving circuitry to receive a first packet from its respective external interconnect and extract a first target RDU identifier from the first packet;

a comparator to compare the first target RDU identifier to the identifier stored in the identity register;

target RDU circuitry to communicate over the intra-RDU network to the array interface circuit or the memory interface circuit based on information in the first packet in response to a determination by the comparator that the first target RDU identifier is equal to the identifier;

pass-through RDU circuitry to access the pass-through table and retrieve the target port interface circuit identifier for the first target RDU identifier and, in response to a determination by the comparator that the first target RDU identifier is not equal to the identifier, send the first target RDU identifier and other information from the first packet to a port interface circuit of the RDU identified by the target port interface circuit identifier over the intra-RDU network; and forwarding circuitry to receive a second target RDU identifier and other information over the intra-RDU network, create a second packet carrying the second target RDU identifier and the other information, and send the second packet over the respective external interconnect.

17. The computing system of claim 16, wherein each RDU of a set of RDUs out of the three or more RDUs is connected to each other RDU in the set of RDUs through a respective external interconnect of the plurality of external interconnects.

18. The computing system of claim 17, wherein the set of RDUs is organized in a ring topology and each RDU in the set of RDUs is also connected to each adjacent RDU in the ring topology through a second respective external interconnect of the plurality of external interconnects so that there are two interface circuits coupling adjacent RDUs in the ring topology.

19. The computing system of claim 18, wherein the pass-through table is configured create counter-rotating dataflow rings using the two interface circuits coupling adjacent RDUs in the ring topology.

20. The computing system of claim 16, wherein a set of RDUs out of the three or more RDUs is organized in a ring topology with each RDU in the set of RDUs connected to each adjacent RDU in the ring topology through a respective external interconnect of the plurality of external interconnects.

* * * * *